Oct. 22, 1940.   A. ARUTUNOFF   2,218,979
METHOD OF MAKING ELECTRIC CABLES
Filed July 10, 1937
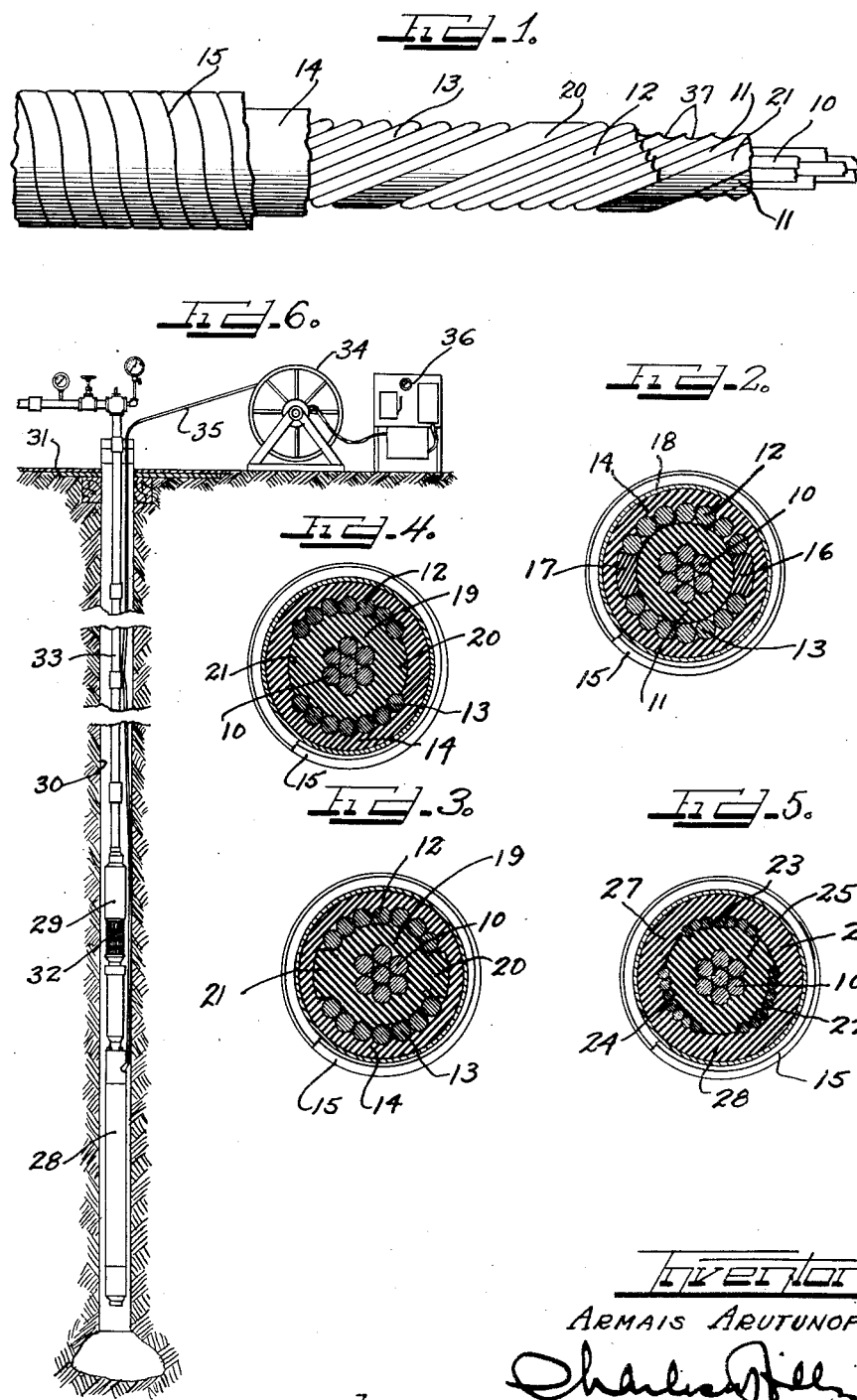
Inventor
ARMAIS ARUTUNOFF.

Patented Oct. 22, 1940

2,218,979

UNITED STATES PATENT OFFICE 2,218,979

METHOD OF MAKING ELECTRIC CABLES

Armais Arutunoff, Bartlesville, Okla., assignor to Reda Pump Company, Bartlesville, Okla., a corporation of Delaware Application July 10, 1937, Serial No. 152,984

3 Claims. (Cl. 173—244)

This invention relates to electric cables and more particularly to a novel method for making a multi-strand, multi-conductor cable, the constructional features of which are claimed in my copending application, Serial No. 152,983.

Many uses have now arisen in a wide variety of industries wherein it is imperative that the over all cross-sectional area of an electric cable be reduced to a minimum. This is particularly true in the oil well industry where electric energy must be supplied to a submerged motor often disposed many thousands of feet down within a deep well casing. Since the electric motor is often disposed below the pumping unit to which it is operatively connected, and since a well casing rarely exceeds a diameter of six or eight inches, it is apparent that the smaller the diameter of the cable which conducts electric energy to the motor, the more desirable it is for use under these circumstances.

It is an object of this invention to provide a novel method of making a cable suitable for use under conditions such as those indicated above.

Another object of this invention is to provide a novel method for making a cable which is economical to manufacture and which is rugged and reliable in use.

It is a further object of this invention to provide a novel method of making a cable which includes a central conductor and a plurality of peripheral conductors twisted thereabout, there being a layer of insulating material between the central conductor and the peripheral conductors and between adjacent peripheral conductors.

It is a still further object of this invention to provide a novel method of making a concentric conductor electric cable which includes simultaneously winding a plurality of peripheral conductors and interposing or forming strips of insulating material about the insulating jacket of a central conductor.

Another and further object of this invention is to provide a novel method of making a multi-conductor electric cable, the cross-sectional area of each of said conductors being such that the electrical resistance of each conductor per unit length of cable is substantially the same under operating conditions.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawing in which:

Figure 1 shows an electric cable with the various elements thereof broken away successively along the length;

Figure 2 is a cross-sectional view of one form of a cable wherein the insulating strip between adjacent peripheral conductors have been wound on the jacket of the central conductor simultaneously with the winding of the peripheral conductor;

Figure 3 is a cross-sectional view of another form of a three conductor cable, the insulating ribs between adjacent peripheral conductors being integral with the insulating jacket about the central conductor;

Figure 4 is a cross-sectional view of a preferred form of my cable wherein the insulating ribs between adjacent peripheral conductors have been formed from the yielding or semi-cured jacket of central conductor as a result of pressure of peripheral conductors on said jacket.

Figure 5 is a cross-sectional view of a four conductor cable similar in construction to Figure 4; and Figure 6 is a diagrammatic view illustrating one of the principal uses for a cable such as that illustrated in Figures 1 to 5 and more particularly Figure 6 illustrates an oil well having a submersible motor and pump unit disposed therein and an electric cable extending down to said motor past the pump.

In Figure 1, a multi-strand multi-conductor electric cable is shown which includes in general a central conductor 10, a layer of insulating material 11 disposed about the central conductor 10, peripheral conductors 12 and 13 spirally wound about jacket 11, an outer jacket of insulating material 14 and an armored sheath 15. The central conductor 10 is preferably formed of a plurality of tinned copper strands, the strand interstices preferably being completely filled with a rubber compound.

Peripheral conductors 12 and 13 also comprise a plurality of strands but instead of being bunched together as the individual strands of the central conductor 10 are, the strands of the peripheral conductors 12 and 13 are spirally wound flat against the outer surface of insulating jacket 11.

Now one of the principal features of the present invention is the manner in which the peripheral conductors 12 and 13 are assembled on the jacket 11 and the manner in which these conductors are insulated from each other. One embodiment of the present invention is illustrated in Figure 2 which shows two insulating strips 16 and 17 which are wound about the insulating jacket 11 between conductors 12 and 13. Insulating strips 16 and 17 are preferably of reinforced construction as for example with fabric or thread to strengthen the cable as a whole.

Due to the fact the peripheral conductors 12 and 13 are twisted about the central conductor 10 it is at once apparent that these peripheral conductors 12 and 13 are greater in length than the central conductor. Therefore if the cross-sectional area of the peripheral conductor were the same as the cross-sectional area of the central conductor the resistance of the peripheral conductor per unit length of cable would be greater than that of the central conductor per unit length of cable. Due to the fact that cable such as that illustrated in Figure 2 is designed primarily to transmit three phase alternating current electric energy, such a difference in the resistance of the conductors per unit of length would cause an undesirable unbalance of electrical characteristics between the phases. It is therefore important that the electrical resistance per unit length of cable be approximately the same under full load operating conditions.

It will also be appreciated that since central conductor 10 is further from the surface of the cable than are conductors 12 and 13 compensation must be made for the thermal increase of resistance of the central conductor due to a higher temperature thereof under full load operating conditions. On account of the central location of the central conductor within the cable, heat created therein can only be dissipated through the very thick insulation of the central conductor and the other conductors. It has been found in practice that under full load operating conditions in certain instances the central conductor will be operating at a temperature requiring an allowance for increased resistivity of 9 to 13 percent. It is important therefore, that the effective cross-sectional area of the central conductor 10 be such with respect to the cross-sectional area of the peripheral conductors 12 and 13 that the resistance of each conductor per unit length of cable be substantially the same under full load operating conditions.

The method and manner in which the cable illustrated in Figure 2 is made will now be described. A central conductor 10 is formed composed of a plurality of strands, seven being shown in the drawing and the interstices between the strands are completely filled with a suitable insulating compound such for example as a rubber compound. A jacket 11 of insulating material is then formed about the central conductor 10. Peripheral conductors 12 and 13 each formed of a plurality of strands, seven being shown in each conductor in the drawing, are then spirally wound about insulating jacket 11. Preferably simultaneously with the winding of peripheral conductors 12 and 13 reinforced insulating strips 16 and 17 are wound thereon between conductors 12 and 13. Although reinforced insulating strips 16 and 17 are preferably wound simultaneously on jacket 11 with peripheral conductors 12 and 13, it will be apparent to those skilled in the art that insulating strips 16 and 17 may be wound thereon either before or after the winding of conductors 12 and 13 without departing from the spirit and scope of the present invention.

After peripheral conductors 12 and 13 and insulating strips 16 and 17 have been wound on insulating jacket 11 of central conductor 10, an outer jacket 14 of suitable insulating material is formed thereabout. Over the outer jacket 14 the usual layer of tape and braid is formed as is indicated at 18 in Figure 2. The tape is preferably oilproof varnished cambric and the braid is preferably woven single braid which has been thoroughly impregnated with an oilproof lacquer. An armored sheath 15 is finally formed about the cable which is preferably of the interlocking galvanized steel strip type.

In Figure 3 of the drawing a different embodiment of the invention is illustrated. More particularly a jacket 19 of insulating material is formed about the central conductor 10 having integral ribs 20 and 21 formed thereon with a plurality of groovelike indentations 37 therebetween. The ribs 20 and 21 form suitable insulating partitions between peripheral conductors 12 and 13. The construction of the cable shown in Figure 3 is otherwise similar to that shown in Figure 2, and although integral ribs 20 and 21 and indentations 37 may be preformed in a spiral about the main body portion of insulating jacket 19, it is preferable from a manufacturing standpoint and from an economical standpoint to form the insulating jacket 11 with ribs 20 and 21 and indentations 37 extending longitudinally thereof. The central conductor 10 and its jacket 11 is then twisted during the application of the peripheral conductors 12 and 13 thereto, the individual strands of conductors 12 and 13 being disposed in indentations 37, such that the longitudinally disposed ribs 20 and 21 are twisted into spirals between which the peripheral conductors 12 and 13 are wound. Although it is preferable to twist the central conductor and the jacket 11 during the winding operation of the peripheral conductors 12 and 13 it will be at once apparent to those skilled in the art that this operation may take place prior to the time when peripheral conductors 12 and 13 are wound on the insulating jacket 11.

Figure 4 shows the preferred embodiment of my cable wherein a three conductor cable is made up of a central multi-strand conductor 10 and two peripheral conductors 12 and 13, but wherein the jacket 19 of the central conductor is left in semi-cured condition; that is, jacket 19 is left soft enough to permit, under pressure of cabling, the sinking of peripheral conductors 12 and 13 therein thus forming ribs 20 and 21 out of an ordinary jacket of circular cross-sectional configuration such as 11 of Figure 2.

After the peripheral conductors 12 and 13 have been wound an outer jacket 14 of suitable insulating material is formed thereabout and the whole assembly is vulcanized together.

It must be noted that irrespective of which of the three constructions is employed, it is important that the ribs, partitions or fillers be cemented, bonded or welded to the adjacent jackets, rather than merely to come in contact therewith in order to accomplish an electrical barrier of high dielectric strength.

For the above reason the construction of Figure 4, employing semi-cured rubber or rubber-like material, has advantages over constructions of Figures 2 and 3 in that semi-cured materials bond together easier and have the further advantage of being manufacturable on ordinary cabling machines whereas the constructions of Figures 2 and 3 usually require special machines.

In the commercial manufacture of the cable illustrated in Figure 4, it has been found highly desirable to build up and form the cable in one continuous process. Specifically the jacket 19 of the central conductor 10 is formed about the multi-strand central conductor 10 and the resulting unit is then passed through a cabling machine where the peripheral conductors 12 and 13 are wound on the jacket 19 under a pressure sufficient to embed them therein. The cable is then passed through a jacketing machine which applies thereto an outer jacket 14. On leaving the jacketing machine the cable is leaded and then wound on a suitable reel or the like where the jackets 19 and 14 are vulcanized or otherwise suitably bonded together. The cable thus formed is economical to manufacture and extremely rugged and reliable in use.

Figure 5 shows a still further embodiment of the present invention wherein a four conductor cable is made up of a central multi-strand conductor 10 and three multistrand peripheral conductors 22, 23 and 24. The insulating jacket 25 about the central conductor 10 forms in this instance three insulating ribs 26, 27 and 28 which serve to space and insulate peripheral conductors 22, 23 and 24 from each other. The four conductor cable of Figure 5 is formed in substantially the same manner as that described in connection with Figure 4.

In Figure 6 of the drawing I have illustrated schematically an instance wherein a cable of the type illustrated in Figure 2, Figure 3, Figure 4, or Figure 5 may be advantageously employed. A submersible motor and pump unit including a motor 28 and a pump 29 are shown suspended in a deep well 30 from the surface of the ground 31. The inlet of the pump is indicated at 32 and the discharge conduit is indicated at 33. Extending from a reel 34 is a cable 35 such as that described above which passes down into the well past the pump 29 to the motor 28 thereby to conduct electric energy from the electric supply panel 36 to the motor.

Although the cable has been described as being particularly applicable for use in conveying electrical energy to submersible motor and pump units in oil wells it will be appreciated that a cable constructed in accordance with the teachings of the present invention has a wide variety of uses in many other industries.

While I have shown particular embodiments of my invention, it will of course be understood that I do not wish to be limited thereto as many modifications may be made, and I therefore contemplate by the appended claims to cover all such modifications as fall within the true spirit and scope of my invention.

I claim as my invention:

1. The method of making concentric electric cable for power transmission which includes covering a conductor with a layer of semi-cured insulating material, spirally winding at least two bare multi-strand peripheral conductors thereon under sufficient pressure to embed the strands of said peripheral conductors in said insulating material, thereby forming partitions or ribs between said peripheral conductors, forming an outer jacket of suitable insulating material embracing said peripheral conductors and said ribs and bonding said outer jacket to said ribs by vulcanizing the whole assembly.

2. The method of making concentric cable for electrical power transmission which includes covering a multi-strand central conductor with a jacket of yielding insulating material, twisting at least two multi-strand peripheral bare conductors having relatively small cross-sectional area with respect to said central conductor about said jacket and embedding the strands of said peripheral conductors in said jacket of yielding material in such manner as to form insulating ribs between said peripheral conductors, and applying an outer jacket thereabouts which bonds itself to the exposed parts of said central jacket.

3. The method of making a concentric cable for electrical power transmission which includes covering a central conductor with a jacket of yielding material, twisting at least two bare multi-strand peripheral conductors around said jacket under a pressure sufficiently high to embed said peripheral conductors in their respective spiral position on said jacket.

ARMAIS ARUTUNOFF.